United States Patent
Endo et al.

(10) Patent No.: US 8,019,114 B2
(45) Date of Patent: Sep. 13, 2011

(54) POSITION AND ORIENTATION MEASUREMENT METHOD AND APPARATUS

(75) Inventors: Takaaki Endo, Urayasu (JP); Kiyohide Satoh, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 11/854,121

(22) Filed: Sep. 12, 2007

(65) Prior Publication Data

US 2008/0069405 A1 Mar. 20, 2008

(30) Foreign Application Priority Data

Sep. 14, 2006 (JP) .................................. 2006-249962

(51) Int. Cl.
*G06K 9/00* (2006.01)
(52) U.S. Cl. .................... 382/100; 382/154; 702/150
(58) Field of Classification Search ................... 382/100
See application file for complete search history.

(56) References Cited

U.S. PATENT DOCUMENTS

| 6,915,008 B2 * | 7/2005 | Barman et al. ................ 382/154 |
| 7,698,094 B2 * | 4/2010 | Aratani et al. ................ 702/150 |
| 2002/0103617 A1 | 8/2002 | Uchiyama et al. |
| 2004/0176925 A1 * | 9/2004 | Satoh et al. ................... 702/150 |

FOREIGN PATENT DOCUMENTS

| JP | 11-084307 | 3/1999 |
| JP | 2000-041173 | 2/2000 |
| JP | 2004-205711 | 7/2004 |

* cited by examiner

*Primary Examiner* — Hadi Akhavannik
(74) *Attorney, Agent, or Firm* — Cowan, Liebowitz & Latman, P.C.

(57) ABSTRACT

A position and orientation measurement apparatus has a subjective-view-index detection unit which detects indices on a physical space from an image captured by a subjective-view camera, an additional subjective-view-index detection unit which detects indices on the physical space from an image captured by an additional subjective-view camera having a spatial resolution different from the subjective-view camera, and a position and orientation estimation unit which calculates the position and orientation of the subjective-view camera using information associated with the image coordinates of the detected indices.

14 Claims, 6 Drawing Sheets

POSITION AND ORIENTATION MEASUREMENT METHOD AND APPARATUS

BACKGROUND OF THE INVENTION

1. Field of the Invention

The present invention relates to a method and apparatus for measuring the position and orientation of an object and, more particularly, those of an image capture device.

2. Description of the Related Art

Measurement of the position and orientation of an image capture unit (to be referred to as a camera hereinafter as needed) such as a camera or the like used to capture an image of a physical space is required in, e.g., a mixed reality system that integrally presents the physical space and a virtual space.

[Related Art 1]

Japanese Patent Laid-Open No. 11-084307, Japanese Patent Laid-Open No. 2000-041173, and A. State, G. Hirota, D. T. Chen, B. Garrett, and M. Livingston: Superior augmented reality registration by integrating landmark tracking and magnetic tracking, Proc. SIGGRAPH '96, pp. 429-438, July 1996. disclose schemes for measuring the position and orientation of a camera using a position and orientation sensor. These related arts also disclose schemes for correcting measurement errors of the position and orientation sensor using markers whose allocation positions on the physical space are known or feature points whose positions on the physical space are known (markers and feature points will be collectively referred to as indices hereinafter).

[Related Art 2]

As disclosed in Kato, Billinghurst, Asano, and Tachibana: Augmented Reality System and its Calibration based on Marker Tracking, Journal of the Virtual Reality Society of Japan, vol. 4, no. 4, pp. 607-616, December 1999., and X. Zhang, S. Fronz, and N. Navab: Visual marker detection and decoding in AR systems: A comparative study, Proc. of International Symposium on Mixed and Augmented Reality (IS-MAR'02), 2002., a method for estimating the position and orientation of a camera based on information of markers captured by a camera without using any position and orientation sensor is known. In these references, square indices are used, and the position and orientation of the camera are estimated based on the coordinates of four vertices of each square. However, since a square is rotation symmetrical every 90° with respect to an axis that passes through its central point (the intersection of diagonal lines) and is perpendicular to its plane as a rotation axis, the directionality (top, bottom, right, and left) cannot be determined from only the vertex coordinates in the image. For this reason, a graphic image having directionality or the like is drawn inside a square index to determine the top, bottom, right, and left from an image obtained by capturing the index. Furthermore, when a plurality of indices are used, since they need be identified based on only the image captured by the camera, graphic information such as unique patterns, symbols, or the like, which are different for respective indices, is drawn inside each index.

[Related Art 3]

As disclosed in US 2004/176925 A1 which is to be incorporated in the present specification by referring to its description contents, a method of enhancing the estimation precision and stability of the position and orientation of a camera by capturing indices using a stereo camera so as to increase the total number of indices to be detected compared to a case using only one camera is known. In US 2004/176925 A1, respective cameras which form the stereo camera have the same resolution and angle of view. The optical axes of the respective cameras agree with nearly the same direction.

[Related Art 4]

Japanese Patent Laid-Open No. 2004-205711 discloses a method of estimating the position and orientation of a camera in a system using a plurality of cameras having different angles of view. In Japanese Patent Laid-Open No. 2004-205711, a camera having one angle of view is used to estimate the position and orientation, and another camera having another angle of view is used to capture an image of an external world. Images captured by the cameras of the respective angles of view are composited and displayed on a head-mounted display.

[Related Art 5]

On the other hand, Shigezumi Kuwajima: 2Way Stereo System miniBEE, the Journal of Virtual Reality Society of Japan, vol. 10, no. 3, pp. 50-51, September 2005. discloses an apparatus which performs three-dimensional (3D) measurement of an object by mutually complementing the measurement results of two different 2-lens stereo cameras for short and long distances. In the apparatus described in this reference, the baseline lengths and focal lengths are selected in correspondence with the short and long distances, and objects at the short and long distances can be simultaneously measured.

In the method of Related Art 1, a small circular, sheet-like object with a specific color can be allocated as an index. In this case, the index has information including a 3D position (coordinates) and color. The 3D position of the index is projected onto the image plane of the camera using the measurement values of the position and orientation sensor, while color region detection processing for detecting the color of the index from an image is executed, thus calculating the barycentric position of the color region in the image. The 3D position of the index projected onto the image lane is compared with the barycentric position of the color region calculated from the image, and an identical index is determined when these positions are close to each other, thereby identifying the index in the image.

In Related Art 1, the camera whose position and orientation are to be measured is a device for capturing an image to be presented to the observer. Therefore, the resolution, angle of view, orientation, and the like of the camera cannot be freely changed to suit the detection of an index. That is, the measurement precision of the position and orientation of the camera is determined depending on the spatial resolution of the camera which is not always optimal to the detection of the index.

On the other hand, the method of measuring the position and orientation of a camera using an index like a square marker, which is used in Related Art 2 and an image of which gives many kinds of information such as vertices, drawn pattern, and the like can be detected is available. In Related Art 2, since each individual marker need be identified from the image alone without using any position and orientation sensor, the index must include code information, symbol information which can serve as a template, and the like.

Figure 6A:
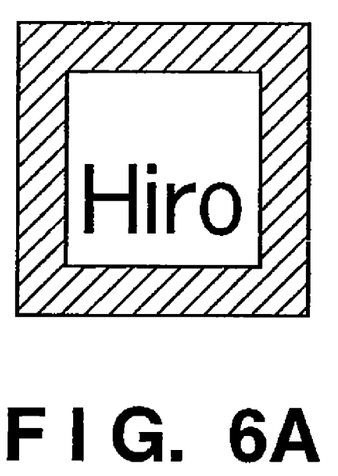
FIGS. 6A to 6C show examples of indices used in the related arts.
Figure 6B:
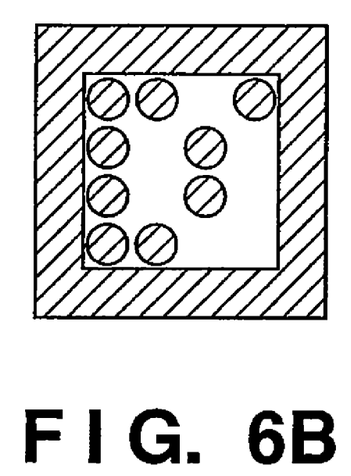
Figure 6C:
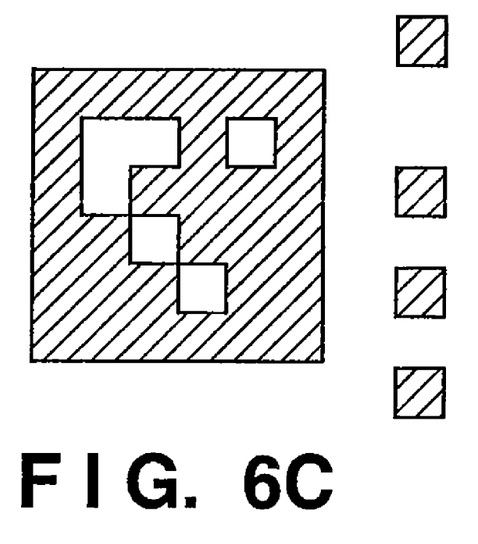

FIGS. 6A to 6C show examples of practical square markers used in the system described in the reference presented as an example of Related Art 2.

Since an index having such a complicated feature must be detected from a captured image, it cannot often be recognized unless it is captured to occupy a sufficiently large area in the captured image frame. In other words, either a broad region on the physical space must be assured to allocate the index, or the camera must sufficiently come near the index. That is, the index allocation conditions are strict.

In Related Art 2 as well, the camera whose position and orientation are to be measured is a device used to capture an image to be presented to the observer, as in Related Art 1. Therefore, the measurement precision of the position and orientation of the camera is determined depending on the spatial resolution of the camera which is not always optimal to the detection of the index, as in Related Art 1.

In Related Art 3 as well, the cameras which form the stereo camera are devices used to capture an image to be presented to the observer. Therefore, the measurement precision of the position and orientation of the camera and the detectable index size are determined depending on the spatial resolution of the camera which is not always optimal to the detection of the index, as in Related Arts 1 and 2.

In Related Art 4, upon calculating the position and orientation of the camera, the plurality of cameras having different angles of view are not used simultaneously, but the camera of one angle of view is used. Therefore, the estimation precision of the position and orientation of the camera is lower than that using a plurality of cameras.

On the other hand, in Related Art 5, the plurality of cameras having different angles of view are used at the same time, but this technique is limited to a method that performs stereo measurement using the cameras of the same angle of view and then combines a plurality of stereo measurement results. Upon applying the scheme of Related Art 5, four or more cameras are required.

SUMMARY OF THE INVENTION

The present invention has been made to solve the problems of these related arts. The present invention enhances the measurement precision and/or stability in a position measurement method and apparatus which measure the position and orientation of an image capture device using an index on the physical space.

According to an aspect of the present invention, there is provided a position and orientation measurement method comprising: a first image input step of inputting a first image captured by a first image capture device which captures an image of a physical space; a second image input step of inputting a second image captured by a second image capture device which has a fixed position and orientation relative to the first image capture device and has a spatial resolution different from the first image capture device; a first detection step of detecting, from the first image, a feature amount associated with image coordinates of an index on the physical space; a second detection step of detecting, from the second image, a feature amount associated with image coordinates of an index on the physical space; and a position and orientation calculation step of calculating a position and orientation of the first image capture device based on the feature amounts associated with the image coordinates of the index detected in the first detection step and the second detection step.

According to another aspect of the present invention, there is provided a position and orientation measurement apparatus comprising: first image input unit which inputs a first image captured by a first image capture device which captures an image of a physical space; second image input unit which inputs a second image captured by a second image capture device which has a fixed position and orientation relative to the first image capture device and has a spatial resolution different from the first image capture device; first detection unit which detects, from the first image, a feature amount associated with image coordinates of an index on the physical space; second detection unit which detects, from the second image, a feature amount associated with image coordinates of an index on the physical space; and position and orientation calculation unit which calculates a position and orientation of the first image capture device based on the feature amounts associated with the image coordinates of the index detected by the first detection unit and the second detection unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A position and orientation measurement apparatus according to the first embodiment of the present invention calculates the position and orientation of a subjective-view camera based on indices detected from images captured by the subjective-view camera and an objective-view camera.

Figure 1:
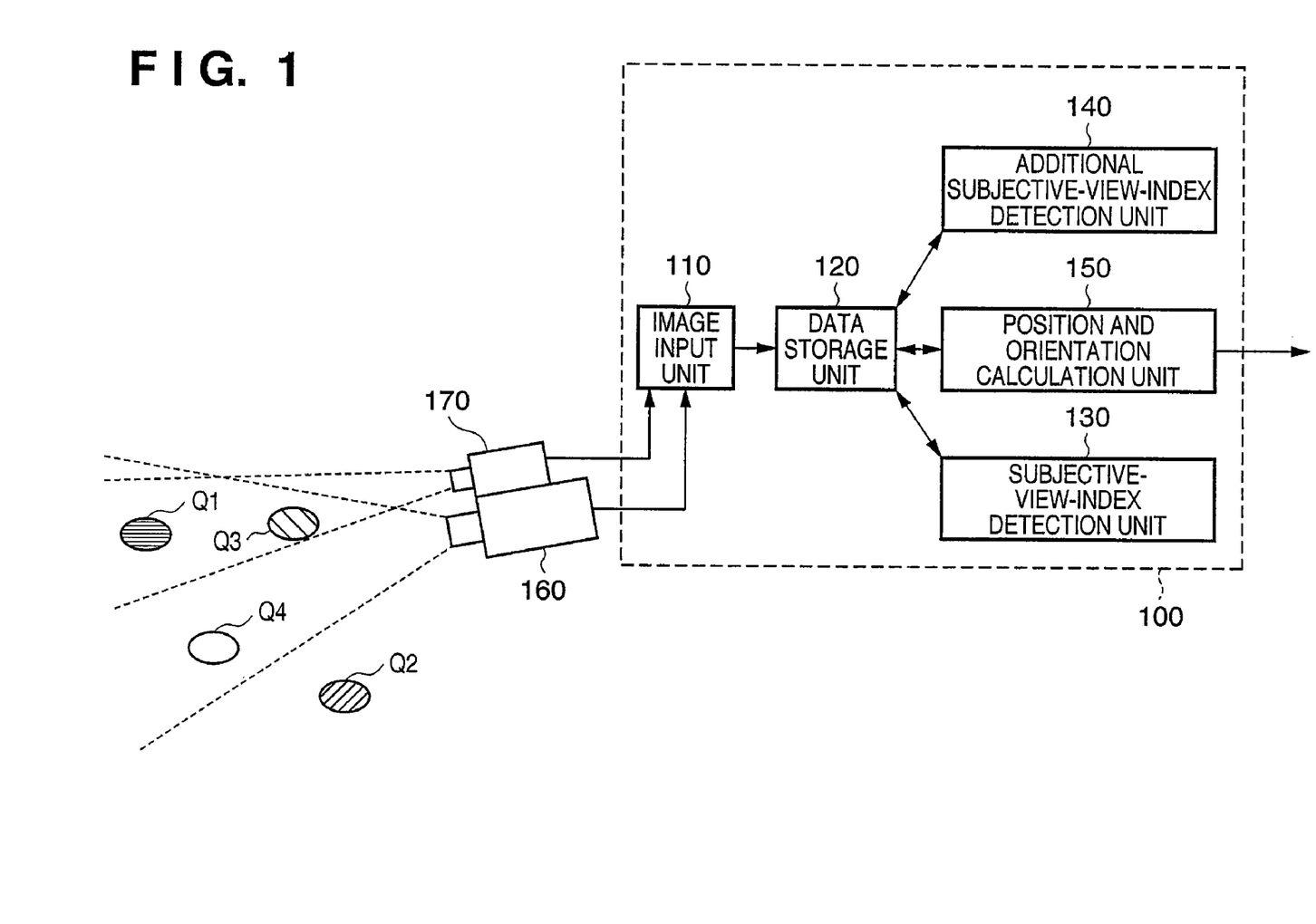
FIG. 1 is a block diagram showing an example of the arrangement of a position and orientation measurement apparatus according to the first embodiment of the present invention.

FIG. 1 is a block diagram showing an example of the arrangement of a position and orientation measurement apparatus according to this embodiment. A position and orientation measurement apparatus 100 of this embodiment comprises an image input unit 110, data storage unit 120, subjective-view-index detection unit 130, additional subjective-view-index detection unit 140, and position and orientation calculation unit 150. The position and orientation measurement apparatus 100 is connected to a subjective-view camera 160 and additional subjective-view camera 170.

In this embodiment, assume that the subjective-view camera 160 as an image capture device to be measured is fixed to, e.g., a head-mounted display (HMD) that the observer wears, and is used to capture an image of a physical space observed nearly from the viewpoint of the observer (subjective viewpoint). The additional subjective-view camera 170 as an additional image capture device has a known position and orientation relative to the subjective-view camera 160 and is set at a fixed position. The image capture range of the additional subjective-view camera 170 overlaps that of the subjective-view camera 160. Note that the image capture range of the additional subjective-view camera 170 may or may not overlap that of the subjective-view camera 160. The subjective-view camera 160 and additional subjective-view camera 170 can be implemented by commercially available color video cameras.

Note that this embodiment uses the "subjective-view" camera for the sake of convenience. However, the image capture device to be measured need not always be a camera which captures an image of physical space observed from the viewpoint position of the observer.

The additional subjective-view camera 170 has the same image resolution (the number of pixels of a captured image) as that of the subjective-view camera 160, and a narrower angle of view than that of the subjective-view camera 160. As a result, the additional subjective-view camera 170 can obtain an image with higher spatial resolution than the subjective-view camera 160. Therefore, indices that cannot be detected from an image captured by the subjective-view camera 160 can be detected from an image captured by the additional subjective-view camera 170. Since the image captured by the additional subjective-view camera 170 has higher spatial resolution, indices can be detected at higher positional precision than that using the image captured by the subjective-view camera 160.

In order to enhance the spatial resolution of the additional subjective-view camera 170, the image resolution of the additional subjective-view camera 170 may be increased. However, size and cost reductions of the additional subjective-view camera 170 can be attained by narrowing the angle of view without changing the image resolution. In this case, a time required for image processing can also be suppressed from being prolonged.

Indices (to be referred to as subjective-view-indices) to be captured by the subjective-view camera 160 or additional subjective-view camera 170 are allocated at a plurality of positions on the physical space. Each subjective-view-index $Q_k$ ($k=1, \ldots, K_Q$) has a known position $x_W^{Qk}$ on a world coordinate system. Note that the world coordinate system is specified by defining one point on the physical space as an origin, and three orthogonal axes as X-, Y-, and Z-axes.

These subjective-view-indices are desirably set so that the total number of them observed on images captured by the subjective-view camera 160 and additional subjective-view camera 170 is always three or more when the subjective-view camera 160 moves within a measurement range. Note that an image to be captured by the subjective-view camera 160 will be referred to as a subjective-view image, and an image to be captured by the additional subjective-view camera 170 will be referred to as an additional subjective-view image hereinafter.

In the example shown in FIG. 1, four subjective-view-indices $Q_1, Q_2, Q_3$, and $Q_4$ are allocated. The three subjective-view-indices $Q_1, Q_3$, and $Q_4$ are included in the field of view of the subjective-view camera 160, and the two subjective-view-indices $Q_1$ and $Q_3$ are included in the field of view of the additional subjective-view camera 170.

In FIG. 1, the fields of view of the subjective-view camera 160 and additional subjective-view camera 170 commonly include only two subjective-view-indices $Q_1$ and $Q_3$. However, the number of subjective-view-indices to be commonly included in the fields of view of these cameras is not limited and, for example, zero index may be included.

The subjective-view-indices $Q_k$ may be circular markers having different colors or feature points such as natural features respectively having different texture features or the like. Alternatively, rectangular indices each formed of a rectangular unicolor region having a certain area may be used. That is, indices of arbitrary forms can be used as long as the image coordinates of a projected image on the captured image can be detected, and each index is identifiable by some method. The subjective-view-indices may be set by an operator or may use those having natural shapes, which are not set by the operator.

Note that the number of indices included in the field of view of the additional subjective-view camera 170, whose angle of view is narrower than that of the subjective-view camera 160 is normally smaller than that included in the field of view of the subjective-view camera 160, and may become zero in some cases. Even in such case, when three or more indices are observed on the subjective-view image, the position and orientation of the subjective-view camera 160 can be calculated. A method of calculating the position and orientation of the subjective-view camera 160 from the world coordinates of the subjective-view-indices and their coordinates in the subjective-view image is known in the field of photo-topography and the like (for example, see R. M. Haralick, C. Lee, K. Ottenberg, and M. Nolle: Review and analysis of solutions of the three point perspective pose estimation problem, International Journal of Computer Vision, vol. 13, no. 3, pp. 331-356, 1994., and D. G. Lowe: Fitting parameterized three-dimensional models to images, IEEE Transactions on PAMI, vol. 13, no. 5, pp. 441-450, 1991.) Hence, a detailed description thereof will not be given.

Conversely, even when the number of indices included in the field of view of the subjective-view camera 160 is zero, if three or more indices are included in the field of view of the additional subjective-view camera 170, the position and orientation of the subjective-view camera 160 can be calculated.

On the other hand, even an index with a size which cannot be detected from the subjective-view image may be detected from the additional subjective-view image captured by the additional subjective-view camera 170 with a higher spatial resolution. Therefore, additional subjective-view-indices suited to the spatial resolution of the additional subjective-view camera 170 may be set independently of the subjective-view-indices. As the additional subjective-view-indices, for example, circular markers having a smaller radius than the subjective-view-indices can be used. Alternatively, feature points such as natural features having texture features finer than the subjective-view-indices or the like may be used. Also, rectangular indices having a smaller area than the subjective-view-indices may be used.

The image input unit 110 converts the subjective-view image and additional subjective-view image input to the position and orientation measurement apparatus 100 into digital data, and saves them in the data storage unit 120.

The subjective-view-index detection unit 130 reads out the subjective-view image from the data storage unit 120, and detects the image coordinates of the subjective-view-indices captured in the subjective-view image. For example, when the subjective-view-indices are markers respectively having different colors, regions corresponding to respective marker colors are detected from the image, and their barycentric positions are determined as the image coordinates of the respective subjective-view-indices.

When the subjective-view-indices are feature points having different texture features, the image coordinates of the subjective-view-indices are detected by making template matching using template images of the respective subjective-view-indices, which are held in advance as known information.

When the rectangular indices are used, the image undergoes binarization processing and labeling to detect regions each formed of four straight lines as index candidates. Furthermore, it is checked if each candidate region includes a specific pattern to eliminate detection errors, and to acquire an identifier of that index. Note that each rectangular index detected in this way is considered as four indices individually specified by four vertices in this embodiment.

The subjective-view-index detection unit 130 outputs the detected image coordinates of the subjective-view-indices and identifiers of these indices to the data storage unit 120. In the following description, an index detected on the subjective-view image will be described as $Q_{kn}$ using an identifier n (n=1, . . . , N) appended to each individual detected index. Note that N is the number of indices detected on the subjective-view image. Also, the image coordinates of the detected index $Q_{kn}$ will be described as $u^{Qkn}$.

For example, in case of FIG. 1, N=3, and identifiers $k_1$=1, $k_2$=3, and $k_3$=4 of the indices and corresponding image coordinates $u^{Qk1}$, $u^{Qk2}$, and $u^{Qk3}$ are output.

The additional subjective-view-index detection unit 140 reads out the additional subjective-view image from the data storage unit 120, and detects the image coordinates of the subjective-view-indices captured in the additional subjective-view image, as in the subjective-view-index detection unit 130.

Furthermore, the additional subjective-view-index detection unit 140 outputs the image coordinates of the detected subjective-view-indices and their identifiers to the data storage unit 120. In the following description, an index detected on the additional subjective-view image will be described as $Q_{km}$ using an identifier m (m=1, . . . , M) appended to each individual detected index. Note that M is the number of indices detected on the additional subjective-view image. Also, the image coordinates of the detected index $Q_{kn}$ will be described as $u^{Qkn}$. For example, in case of FIG. 1, M 2, and identifiers $k_1$=1 and $k_2$=3 of the indices and corresponding image coordinates $u^{Qk1}$ and $u^{Qk2}$ are output.

The position and orientation calculation unit 150 acquires, from the data storage unit 120, a set of:

the image coordinates $u^{Qkn}$ of the respective subjective-view-indices detected by the subjective-view-index detection unit 130;

the image coordinates $u^{Qkm}$ of the respective subjective-view-indices detected by the additional subjective-view-index detection unit 140; and the world coordinates $x_W^{Qk}$ of the subjective-view-indices held in advance as known information.

Then, the position and orientation calculation unit 150 calculates (estimates) the position and orientation of the subjective-view camera 160 based on these pieces of information. The calculated position and orientation are output to the data storage unit 120 in the form of a pair of a 3D vector $x_W^{C1}$ that represents the position, and a 3×3 matrix $R_{WC1}$ that represents the orientation.

The data storage unit 120 holds in advance data such as the world coordinates of the subjective-view-indices as known values, camera parameters of the subjective-view camera 160 and additional subjective-view camera 170, and the like. Also, the data storage unit 120 holds the subjective-view image and additional subjective-view image input from the image input unit 110, and the image coordinates and identifiers of the respective indices input from the subjective-view-index detection unit 130 and additional subjective-view-index detection unit 140. Furthermore, the data storage unit 120 holds the values of the position and orientation of the subjective-view camera 160 input from the position and orientation calculation unit 150.

Note that each of the image input unit 110, data storage unit 120, subjective-view-index detection unit 140, and additional subjective-view-index detection unit 150 shown in FIG. 1 can be configured by independent hardware. Alternatively, the functions of the respective units may be implemented by software when a CPU (not shown) executes programs. The CPU that implements the respective units by software may be a common CPU or a plurality of different CPUs. The functions of the respective units may be implemented by distributed processes of a plurality of computers connected via a network. Assume that this embodiment has a configuration in which the functions of the respective units (image input unit 110, data storage unit 120, subjective-view-index detection unit 140, and additional subjective-view-index detection unit 150) are implemented when one CPU executes programs.

Figure 2:
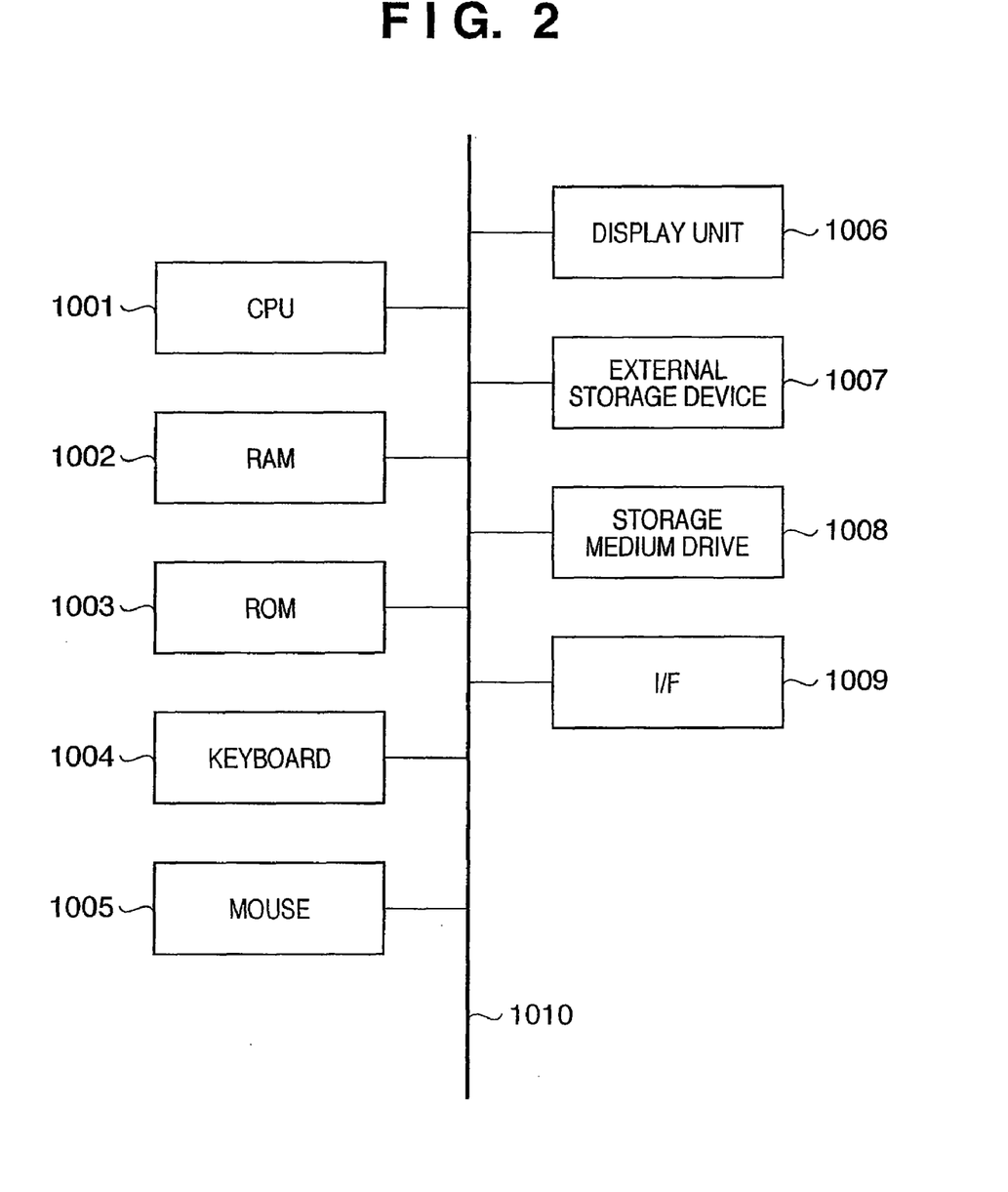
FIG. 2 is a block diagram showing an example of the basic arrangement of a computer which can serve as a position and orientation measurement apparatus 100 according to the embodiment of the present invention.

FIG. 2 is a block diagram showing an example of the basic arrangement of a computer which can serve as the position and orientation measurement apparatus 100 of this embodiment.

As described above, in this embodiment, the image input unit 110, data storage unit 120, subjective-view-index detection unit 140, and additional subjective-view-index detection unit 150 are implemented by software by executing programs.

A CPU 1001 controls the overall computer using programs and data stored in a RAM 1002 and ROM 1003. The CPU 1001 executes programs that implement the functions of the image input unit 110, data storage unit 120, subjective-view-index detection unit 140, and additional subjective-view-index detection unit 150, and serves as these units.

The RAM 1002 comprises an area for temporarily storing programs and data loaded from an external storage device 1007 and storage medium drive 1008. The RAM 1002 also comprises a work area required for the CPU 1001 to execute various kinds of processing. In this embodiment, the function of the data storage unit 120 is implemented by the RAM 1002.

The ROM 1003 generally stores programs to be executed by the CPU 1001 upon starting up the computer, various setting data, and the like. A keyboard 1004 and mouse 1005 are input devices, and the operator can input various instructions to the computer using these input devices. The CPU 1001 detects inputs using these input devices.

A display unit 1006 comprises a CRT monitor, LCD, or the like, and can display, e.g., messages and the like to be displayed for the position and orientation measurement of the subjective-view camera 160.

The external storage device 1007 is a large-capacity storage device such as a hard disk or the like, and saves an OS (operating system), application programs, and the like. In this embodiment, the external storage device 1007 stores pieces of information described as known information, which are loaded onto the RAM 1002 as needed.

The storage medium drive 1008 reads out programs and data stored in a storage medium such as a CD-ROM, DVD-ROM, or the like in accordance with an instruction from the CPU 1001, and outputs them to the RAM 1002 and external storage device 1007.

An I/F 1009 includes various interfaces used to connect external devices. In this embodiment, the I/F 1009 includes interfaces used to connect the subjective-view camera 160 and additional subjective-view camera 170, and network interfaces used to output measurement results and the like. More specifically, the I/F 1009 includes an analog video interface, digital input/output interface (USB, IEEE1394, or the like), Ethernet® interface, and the like.

Data input via the I/F 1009 are fetched on the RAM 1009. Some functions of the image input unit 110 are implemented by the I/F 1009.

A bus 1010 connects the aforementioned units to allow intercommunications.

(Position and Orientation Calculation Processing)

Figure 3:
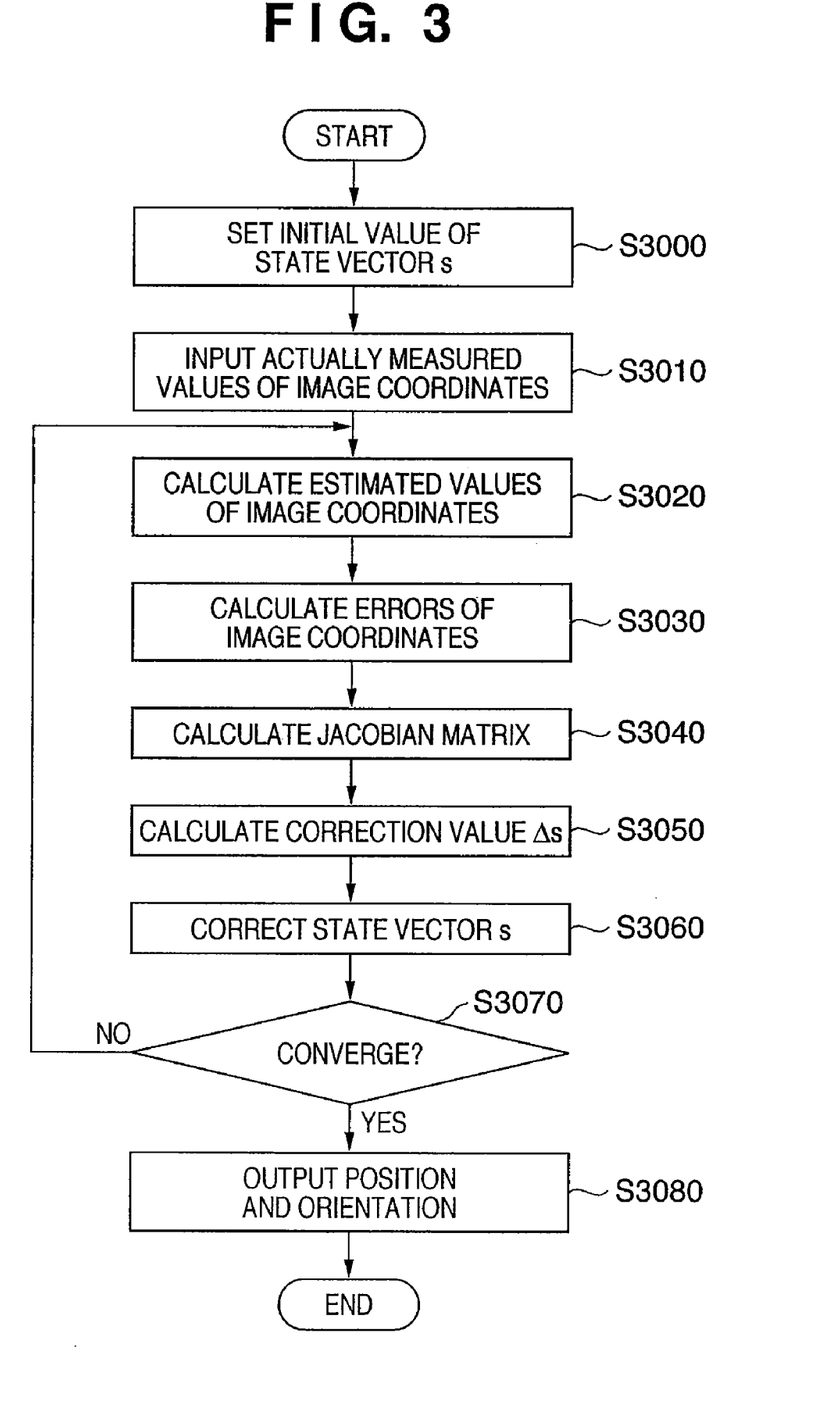
FIG. 3 is a flowchart for explaining the operation of a position and orientation calculation unit 150 in the position and orientation measurement apparatus of the first embodiment.

FIG. 3 is a flowchart for explaining the operation of the position and orientation calculation unit 150 in the position and orientation measurement apparatus of this embodiment.

As described above, the CPU 1001 serves as the position and orientation calculation unit 150 when it executes a program. Assume that the program code required for the CPU 101 to implement this processing has already been loaded onto the PAM 1002 prior to execution of the following processing. In this embodiment, the position and orientation of the subjective-view camera 160 are calculated by the numerical calculation method by repeated operations.

The position and orientation calculation unit 150 internally expresses the position and orientation of the subjective-view camera 160 by three-valued vectors $[x\ y\ z]^T$ and $[\xi\ \psi\ \zeta]^T$. Various methods are available to express the orientation using three values. In this embodiment, the orientation is expressed by a three-valued vector, so that the rotation angle is defined by the size of the vector and the rotation axis direction is defined by the direction of the vector. At this time, unknown parameters to be calculated are described by a six-valued state vector $s=[x\ y\ z\ \xi\ \psi\ \zeta]^T$.

In step S3000, the position and orientation calculation unit 150 sets appropriate initial values (estimated values of the position and orientation) in the state vector s. For example, upon calculating the position and orientation for each image frame of the subjective-view image and additional subjective-view image, s derived in the processing of the previous frame (time $t_{k-1}$) can be used as the initial values. Also, predicted values based on a change in s within a predetermined nearest period may be used as the initial values.

In step S3010, the position and orientation calculation unit 150 acquires actually measured values $u^{Qkn}$ of the image coordinates and identifiers $k_n$ of respective subjective-view-indices $Q^{kn}$ detected by the subjective-view-index detection unit 130 from the data storage unit 120. Also, the position and orientation calculation unit 150 acquires actually measured values $u^{Qkm}$ of the image coordinates and identifiers $k_m$ of respective subjective-view-indices $Q^{km}$ detected by the additional subjective-view-index detection unit 140 from the data storage unit 120.

In step S3020, the position and orientation calculation unit 150 calculates estimated values $u^{Qkn}*$ and $u^{Qkm}*$ of the image coordinates for the subjective-view-indices $Q^{kn}$ detected from the subjective-view image and subjective-view-indices $Q^{km}$ detected from the additional subjective-view image.

Each $u^{Qkn}*$ is calculated based on the world coordinates $x_W^{Qkn}$ of each index $Q^{kn}$ which is held in advance as known information in the data storage unit 120 and a function of the current state vector s:

$$u^{Q^*_{k_n}} = F_{C_1}\left(x_W^{Q_{k_n}}, s\right) \quad (1)$$

Also, each $u^{Qkm}*$ is calculated based on the world coordinates $x_W^{Qkm}$ of each index $Q^{km}$ which is held in advance as known information in the data storage unit 120 and a function of the current state vector s:

$$u^{Q^*_{k_m}} = F_{C_2}\left(x_W^{Q_{k_m}}, s\right) \quad (2)$$

More specifically, the function $F_{C_1}()$ is configured by an equation which is required to calculate the subjective-view camera coordinates (a coordinate system specified by defining one point on the subjective-view camera 160 as an origin, and defining three orthogonal axes as X-, Y-, and Z-axes) $x_{C_1}^{Qkn}$ of the index of interest from $x_W^{Qkn}$ and s, and is described by:

$$x_{C_1}^{Q_{k_n}} = \begin{bmatrix} x_{C_1}^{Q_{k_n}} & y_{C_1}^{Q_{k_n}} & z_{C_1}^{Q_{k_n}} & 1 \end{bmatrix}^T = M_{WC_1}(s)^{-1} \cdot x_W^{Q_{k_n}} \quad (3)$$

and an equation which is required to calculate subjective-view image coordinates $u^{Qkn}*$ from the subjective-view camera coordinates $x_{C_1}^{Qkn}$ and is described by:

$$u^{Q^*_{k_n}} = \begin{bmatrix} u_x^{Q^*_{k_n}} & u_y^{Q^*_{k_n}} \end{bmatrix}^T = \begin{bmatrix} -f_x^{C_1} \dfrac{x_{C_1}^{Q_{k_n}}}{z_{C_1}^{Q_{k_n}}} & -f_y^{C_1} \dfrac{y_{C_1}^{Q_{k_n}}}{z_{C_1}^{Q_{k_n}}} \end{bmatrix}^T \quad (4)$$

where $f^{C_1}_x$ and $f^{C_1}_y$ are the focal lengths of the subjective-view camera 160 in the x- and y-axis directions, and are held in advance as known values in the data storage unit 120. Also, $M_{WC_1}(s)$ is a modeling transformation matrix defined by s (i.e., a matrix for transforming the coordinates on the subjective-view camera coordinate system into those on the world coordinate system) and is defined by:

$$M_{WC_1}(s) = \begin{bmatrix} \dfrac{\xi^2}{\theta^2}(1-\cos\theta) + \cos\theta & \dfrac{\xi\psi}{\theta^2}(1-\cos\theta) - \dfrac{\zeta}{\theta}\sin\theta & \dfrac{\xi\zeta}{\theta^2}(1-\cos\theta) + \dfrac{\psi}{\theta}\sin\theta & x \\ \dfrac{\psi\xi}{\theta^2}(1-\cos\theta) + \dfrac{\zeta}{\theta}\sin\theta & \dfrac{\psi^2}{\theta^2}(1-\cos\theta) + \cos\theta & \dfrac{\psi\zeta}{\theta^2}(1-\cos\theta) - \dfrac{\xi}{\theta}\sin\theta & y \\ \dfrac{\zeta\xi}{\theta^2}(1-\cos\theta) - \dfrac{\psi}{\theta}\sin\theta & \dfrac{\zeta\psi}{\theta^2}(1-\cos\theta) + \dfrac{\xi}{\theta}\sin\theta & \dfrac{\zeta^2}{\theta^2}(1-\cos\theta) + \cos\theta & z \\ 0 & 0 & 0 & 1 \end{bmatrix} \quad (5)$$

$$(\text{for } \theta = \sqrt{\xi^2 + \psi^2 + \zeta^2})$$

On the other hand, the function $F_{C_2}()$ is configured by an equation which is required to calculate additional subjective-view camera coordinates (a coordinate system specified by defining one point on the additional subjective-view camera 170 as an origin, and defining three orthogonal axes as X-, Y-, and Z-axes) $x_{C_2}^{Qkm}$ of the index of interest from $x_W^{Qkm}$ and s, and is described by:

$$x_{C_2}^{Q_{k_m}} = M_{C_1 C_2}^{-1} \cdot M_{WC_1}(s)^{-1} \cdot x_W^{Q_{k_m}} \quad (6)$$

and an equation which is required to calculate additional subjective-view image coordinates $u^{Qkm*}$ from the additional subjective-view camera coordinates $x_{C2}^{Qkm}$ and is described by:

$$u^{Q_{k_m}^*} = \begin{bmatrix} u_x^{Q_{k_m}^*} & u_y^{Q_{k_m}^*} \end{bmatrix}^T = \begin{bmatrix} -f_x^{C_2} \frac{x_{C_2}^{Q_{k_m}}}{z_{C_2}^{Q_{k_m}}} & -f_y^{C_2} \frac{y_{C_2}^{Q_{k_m}}}{z_{C_2}^{Q_{k_m}}} \end{bmatrix}^T \quad (7)$$

where $M_{C1C2}$ is a transformation matrix from the additional subjective-view camera coordinate system into the subjective-view camera coordinate system. Assume that $M_{C1C2}$ is calculated in advance based on the position and orientation (held in advance as known values in the data storage unit 120) of the additional subjective-view camera 170 on the subjective-view camera coordinate system. $f^{C2}_x$ and $f^{C2}_y$ are the focal lengths of the additional subjective-view camera 170 in the x- and y-axis directions, and are held in advance as known values in the data storage unit 120.

In step S3030, the position and orientation calculation unit 150 calculates errors $\Delta u^{Qkn}$ between estimated values $u^{Qkn*}$ and actually measured values $u^{Qkn}$ of the image coordinates for respective subjective-view-indices $Q^{kn}$ by:

$$\Delta u^{Q_{k_n}} = u^{Q_{k_n}} - u^{Q_{k_n}^*} \quad (8)$$

Also, the position and orientation calculation unit 150 calculates errors $\Delta u^{Qkm}$ between estimated values $u^{Qkm*}$ and actually measured values $u^{Qkm}$ of the image coordinates for respective additional subjective-view-indices $Q^{km}$ by:

$$\Delta u^{Q_{k_m}} = u^{Q_{k_m}} - u^{Q_{k_m}^*} \quad (9)$$

In step S3040, the position and orientation calculation unit 150 calculates a Jacobian matrix $J_{us}^{QKn}$ ($=\partial u^{Qkn}/\partial s$) of 2 rows×6 columns having, as respective elements, solutions obtained by partially differentiating the function $F_{C1}( )$ given by equation (1) by the respective elements of the state vector s. Also, the position and orientation calculation unit 150 calculates a Jacobian matrix $J_{us}^{QKm}$ ($=\partial u^{Qkm}/\partial s$) of 2 rows×6 columns having, as respective elements, solutions obtained by partially differentiating the function $F_{C2}( )$ given by equation (2) by the respective elements of the state vector s.

More specifically, the position and orientation calculation unit 150 calculates a Jacobian matrix $J_{ux}^{Qkn}$ ($=\partial u^{Qkn}/\partial x^{Qkn}$) of 2 rows×3 columns having, as respective elements, solutions obtained by partially differentiating the right-hand side of equation (4) by the elements of the subjective-view camera coordinates $x_{C1}^{Qkn}$, and a Jacobian matrix $J_{xs}^{Qkn}$ ($=\partial x^{Qkn}/\partial s$) of 3 rows×6 columns having, as respective elements, solutions obtained by partially differentiating the right-hand side of equation (3) by the elements of the vector s, and calculates $J_{us}^{Qkn}$ by:

$$J_{us}^{Q_{k_n}} = J_{ux}^{Q_{k_n}} \cdot J_{xs}^{Q_{k_n}} \quad (10)$$

Also, the position and orientation calculation unit 150 calculates a Jacobian matrix $J_{ux}^{Qkm}$ ($=\partial u^{Qkm}/\partial x^{Qkm}$) of 2 rows×3 columns having, as respective elements, solutions obtained by partially differentiating the right-hand side of equation (7) by the elements of the additional subjective-view camera coordinates $x_{C2}^{Qkm}$, and a Jacobian matrix $J_{xs}^{Qkm}$ ($=\partial x^{Qkm}/\partial s$) of 3 rows×6 columns having, as respective elements, solutions obtained by partially differentiating the right-hand side of equation (6) by the elements of the vector s, and calculates $J_{us}^{Qkm}$ by:

$$J_{us}^{Q_{k_m}} = J_{ux}^{Q_{k_m}} \cdot J_{xs}^{Q_{k_m}} \quad (11)$$

In step S3050, the position and orientation calculation unit 150 calculates a correction value $\Delta s$ of the state vector s based on the errors $\Delta u^{Qkn}$ and $\Delta u^{Qkm}$ calculated in steps S3030 and S3040, and the Jacobian matrices $J_{us}^{Qkn}$ and $J_{us}^{Qkm}$. More specifically, the unit 150 generates a 2(N+M)-dimensional error vector which is defined by vertically arranging errors $\Delta u^{Qkn}$ and $\Delta u^{Qkm}$ and is described by:

$$U = \begin{bmatrix} \Delta u^{Q_{k1}} \\ \vdots \\ \Delta u^{Q_{kN}} \\ \Delta u^{Q_{k1}} \\ \vdots \\ \Delta u^{Q_{kM}} \end{bmatrix} \quad (12)$$

and a matrix of 2(N+M) rows×6 columns, which is defined by vertically arranging the Jacobian matrices $J_{us}^{Qkn}$ and $J_{us}^{Qkm}$, and is described by:

$$\Theta = \begin{bmatrix} J_{us}^{Q_{k1}} \\ \vdots \\ J_{us}^{Q_{kN}} \\ J_{us}^{Q_{k1}} \\ \vdots \\ J_{us}^{Q_{kM}} \end{bmatrix} \quad (13)$$

Then, the unit 150 calculates $\Delta s$ using a pseudo inverse matrix $\Theta^+$ of $\Theta$ as:

$$\Delta s = \Theta^+ U \quad (14)$$

In the example of FIG. 1, since N=3 and M=2, U is a 10-dimensional vector, and $\Theta$ is a matrix of 10 rows×6 columns.

Since the additional subjective-view camera 170 has higher spatial resolution than the subjective-view camera 160, indices observed on the additional subjective-view image have higher reliability than those observed on the subjective-view image. Hence, the position and orientation calculation unit 150 increases a weight for the indices observed on the additional subjective-view image to improve the calculation precision of $\Delta s$. That is, the unit 150 calculates the pseudo inverse matrix $\Theta^+$ in equation (14) as:

$$\Theta^+ = (\Theta^T \cdot W \cdot \Theta)^{-1} \Theta^T \cdot W \quad (15)$$

where W is a matrix of 2(N+M) rows×2(N+M) columns, which represents the weight, and is defined by:

$$W = \begin{bmatrix} w_1 & 0 & 0 \\ 0 & \ddots & 0 \\ 0 & 0 & w_{2(N+M)} \end{bmatrix} \quad (16)$$

where $w_n$ (n=1, ..., 2N) and $w_m$ (m=2N+1, ..., 2(N+M)) are constant values.

For example, when angle of view (°) of subjective-view camera 160/angle of view (°) of additional subjective-view camera 170=α, $w_n$ and $w_m$ can be defined to meet:

$$w_m = \alpha \times w_n$$

In step S3060, the position and orientation calculation unit 150 corrects the state vector s using the correction value Δs calculated in step S3050 according to:

$$s + \Delta s \rightarrow s \quad (17)$$

and sets the obtained values as new estimated values of s.

The position and orientation calculation unit 150 checks in step S3070 if the calculations converge using some criteria as to whether or not the error vector U or the correction value Δs is smaller than a predetermined threshold. If the calculations do not converge, the unit 150 executes the processing in step S3020 and subsequent steps again using the state vector after correction.

If it is determined in step S3070 that the calculations converge, the position and orientation calculation unit 150 outputs the obtained state vector as information of the position and orientation of the subjective-view camera 160 to the data storage unit 120 in step S3080. The unit 150 outputs the information of the position and orientation in the form of a pair of the 3D vector $x_W^{C1}$ that represents the position, and the 3×3 matrix $R_{WC1}(s)$ that represents the orientation.

With the aforementioned processing, the position and orientation of the subjective-view camera 160 can be calculated with higher precision than a case of using only a subjective-view image or a case using a stereo camera having the same spatial resolution.

In this embodiment, the position and orientation calculation unit 150 repetitively executes processes in steps S3020 to S3060 (repeated operations) until the calculations are converted. In the repetitive processing, first several repeated operations may use only the information of the subjective-view image, and repeated operations after the several operations may also use the information of the additional subjective-view image with high spatial resolution at the same time. In this way, the processing time can be shortened without deteriorating the precision of the finally calculated position and orientation of the subjective-view camera 160.

In this embodiment, the directions of the optical axes of the subjective-view camera 160 and additional subjective-view camera 170 nearly agree with each other, but they may be different. In general, the positional precision in the optical axis direction of a camera is different from that in the in-frame direction. Therefore, for example, when the optical axis of the subjective-view camera 160 is set in a direction different from that of the additional subjective-view camera 170, the positional precisions in both the optical axis direction and in-frame direction can be improved by complementing the positional precisions with each other. When the optical axis of the subjective-view camera 160 is set in a direction 90° different from that of the additional subjective-view camera 170, the optical axis direction of one camera agrees with the in-frame direction of the other camera. In this case, the positional precisions of the subjective-view camera 160 in both the optical axis direction and in-frame direction can be fully improved.

As described above, according to this embodiment, a second camera with a higher spatial resolution is used together with a first camera as an object whose position and orientation are to be measured, and the position and orientation of the first camera are calculated using information of indices detected from the images captured by the two cameras. Since the information of each index detected from the image captured by the second camera has higher reliability than that of the index detected from the image captured by the first camera, the position and orientation with higher precision can be calculated.

For example, the first camera must capture a subjective-view image to be presented to the observer, and the angle of view and the like of the first camera cannot be changed like in an MR system in some cases. Even in such case, according to this embodiment, the second camera is added, and the position and orientation are calculated using the images captured by the two cameras, thus improving the position and orientation measurement precision of the first camera.

Second Embodiment

The second embodiment of the present invention will be described hereinafter.

A position and orientation measurement apparatus according to this embodiment calculates the position and orientation of a subjective-view camera based on indices detected from an image captured by the subjective-view camera first. Then, the apparatus corrects the position and/or orientation based on indices detected from an image captured by an additional subjective-view camera with higher spatial resolution.

The position and orientation measurement apparatus according to this embodiment will be described below. Note that the arrangement of the position and orientation measurement apparatus according to this embodiment can be the same as that shown in FIG. 1, except for the operation of the position and orientation calculation unit 150. Hence, only the operation of the position and orientation calculation unit 150 will be described below.

Figure 4:
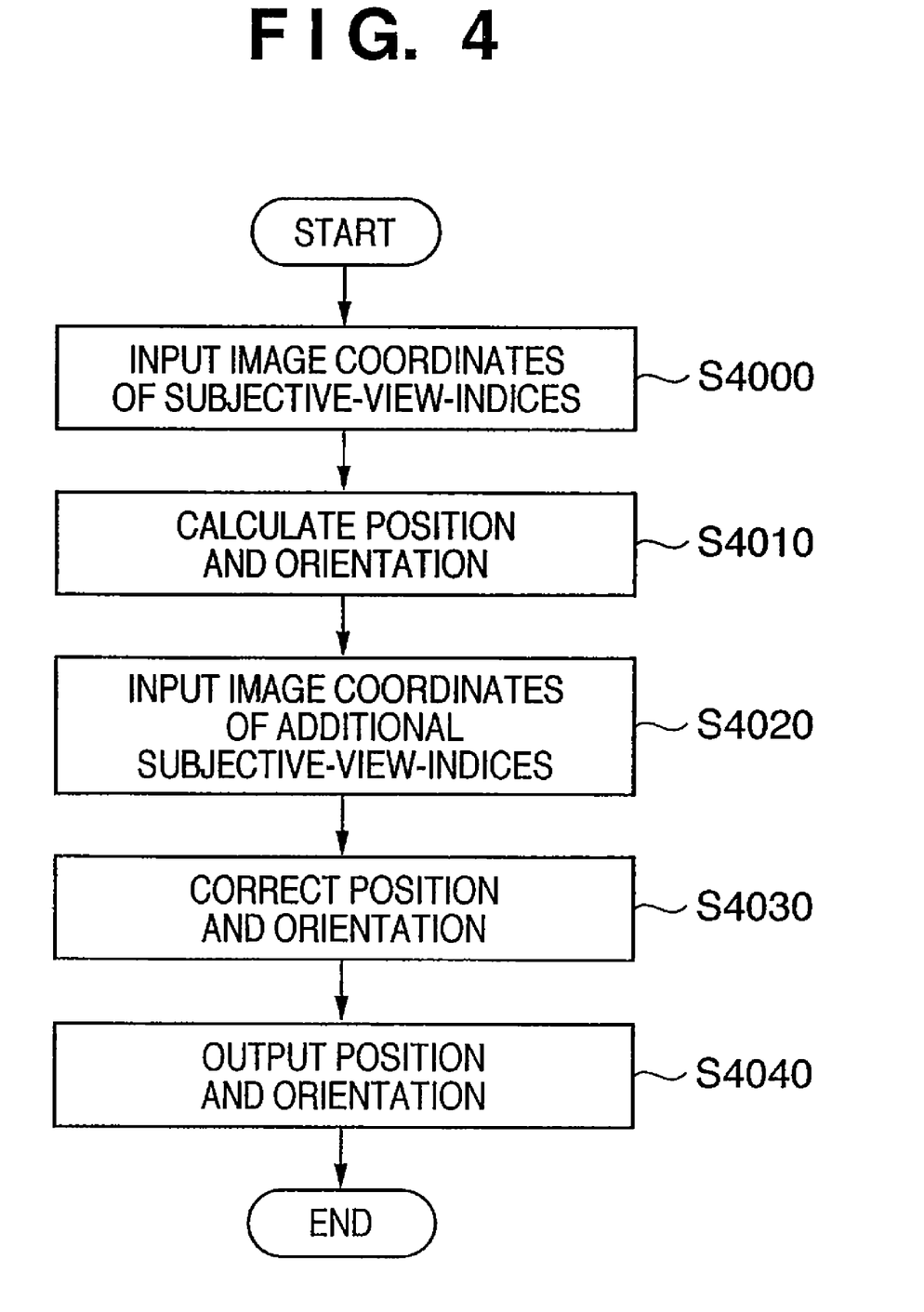
FIG. 4 is a flowchart for explaining the operation of a position and orientation calculation unit 150 in the position and orientation measurement apparatus of the second embodiment.

FIG. 4 is a flowchart for explaining the operation of the position and orientation calculation unit 150 in the position and orientation measurement apparatus of this embodiment. In this embodiment as well, the CPU 1001 serves as the position and orientation calculation unit 150 when it executes a program. Assume that the program code required for the CPU 101 to implement this processing has already been loaded onto the RAM 1002 prior to execution of the following processing. In this embodiment, the position and orientation of the subjective-view camera 160 are calculated by the numerical calculation method by repeated operations.

In step S4000, the position and orientation calculation unit 150 acquires the image coordinates of the subjective-view-indices detected by the subjective-view-index detection unit 130 from the data storage unit 120.

In step S4010, the position and orientation calculation unit 150 calculates the position and orientation of the subjective-view camera 160, which minimize the errors between the indices on the subjective-view image. More specifically, the unit 150 can calculate the position and orientation of the subjective-view camera 160 using a method described in, for example, R. M. Haralick, C. Lee, K. Ottenberg, and M. Nolle: Review and analysis of solutions of the three point perspective pose estimation problem, International Journal of Computer Vision, vol. 13, no. 3, pp. 331-356, 1994., and D. G. Lowe: Fitting parameterized three-dimensional models to images, IEEE Transactions on PAMI, vol. 13, no. 5, pp. 441-450, 1991.

In step S4020, the position and orientation calculation unit 150 acquires the image coordinates of the subjective-view-indices detected by the additional subjective-view-index detection unit 140 from the data storage unit 120.

In step S4030, the position and orientation calculation unit 150 corrects the orientation of the subjective-view camera 160 using the image coordinates of the subjective-view-indices detected by the additional subjective-view-index detection unit 140. Since the additional subjective-view camera 170 has higher spatial resolution than the subjective-view camera 160, the orientation of the subjective-view camera 160 can be calculated with high precision using the image coordinates of the subjective-view-indices detected by the additional subjective-view-index detection unit 140. On the other hand, the angle of view of the additional subjective-view camera 170 is narrower than the subjective-view camera 160, and is closer to an orthogonal projection. Therefore, a subjective-view image is more suitable in terms of use in the calculations of position. For this reason, in this embodiment, only the orientation of the subjective-view camera 160 is corrected by a method described in method 3 of US 2002/0103617 A1 incorporated in the present specification by referring to its description contents. Note that the image coordinates of the respective subjective-view-indices predicted based on the position and orientation of the subjective-view camera 160 calculated in step S4010 can be Pi in method 3 of US 2002/0103617 A1. Also, the image coordinates of the subjective-view-indices detected by the additional subjective-view-index detection unit 140 can be Qi of method 3 of US 2002/0103617 A1.

Note that additional subjective-view-indices to be detected using the additional subjective-view camera 170 may be set independently of the subjective-view-indices. For example, in this embodiment, even indices each of which cannot be individually identified can be used as additional subjective-view-indices. That is, the additional subjective-view-indices can be circular markers having nearly identical colors, natural features such as edges and the like, textures having repetitive patterns, and the like. Even such indices can be used as additional subjective-view-indices as long as they can be identified using the rough position and orientation of the subjective-view camera 160 calculated in step S4010 in advance.

When the difference between the angles of view of the subjective-view camera 160 and additional subjective-view camera 170 is smaller than a threshold, both the position and orientation of the subjective-view camera 160 may be corrected by a method described in, e.g., US 2002/0103617 A1.

In step S4040, the position and orientation calculation unit 150 outputs the information of the calculated position and orientation of the subjective-view camera 160 to the data storage unit 120 in the form of a pair of the 3D vector $x_W^{C1}$ that represents the position, and the 3×3 matrix $R_{WC1}$ that represents the orientation.

With the aforementioned processing, the position and orientation of the subjective-view camera 160 can be calculated with higher precision than the case in which the subjective-view image alone is used.

As described above, according to the present invention, the position and orientation of the subjective-view camera 160 calculated based on the indices detected from the subjective-view image are corrected based on the indices detected from the image captured by the additional subjective-view camera 170 with higher spatial resolution. As a result, the precision upon calculating the position and orientation of the subjective-view camera 160 can be improved.

Note that the order of processes may be reversed to that described above. More specifically, the position and orientation of the subjective-view camera are calculated based on the indices detected from the additional subjective-view image, and the position of the subjective-view camera may be corrected based on the indices detected from the subjective-view image by, e.g., the method described in US 2002/0103617

(Modification 1)

In each of the above embodiment, the angle of view of the additional subjective-view camera may be larger than that of the subjective-view camera. As a result, the number of indices included in the field of view of the additional subjective-view camera increases, and the position and orientation of the subjective-view camera can be stably calculated.

In this case, in the repeated operation processes of the first embodiment, only the information of the additional subjective-view camera with lower spatial resolution may be used in first several repeated operations, and that of the subjective-view camera with higher spatial resolution may also be used from the middle steps at the same time.

In the sequential processes of the second embodiment, the position and orientation of the subjective-view camera may be calculated based on the indices detected from the additional subjective-view image, and the orientation of the subjective-view camera may then be corrected based on the indices detected from the subjective-view image. Upon using an additional subjective-view camera with a larger angle of view than the subjective-view camera, since indices projected onto the additional subjective-view image separate from an orthogonal projection, the position of the subjective-view camera can be calculated with higher precision when using the additional subjective-view image. Therefore, the position and orientation of the subjective-view camera may be calculated based on the indices detected from the subjective-view image, and the position of the subjective-view camera may then be corrected based on the indices detected from the additional subjective-view image using a method described in, e.g., method 5 of US 2002/0103617 A1.

(Modification 2)

In each of the embodiments, a sensor which measures the position, orientation, or information associated with their time derivatives may be located on the subjective-view camera to calculate the position and orientation of the subjective-view camera.

When a position sensor is located, the position and orientation of the subjective-view camera can be calculated by, e.g., a scheme described in US 2004/176925 A1. In this case, the apparatus need only be set so that a total of at least two or more indices are always observed on the subjective-view image captured by the subjective-view camera, and the additional subjective-view image captured by the additional subjective-view camera. In this case, the position and orientation of the subjective-view camera can be calculated more stably than the case in which image information alone is used.

When an orientation sensor is located, the position and orientation of the subjective-view camera can be calculated by, e.g., a scheme described in Hirofumi Fujii, Masayuki Kanbara, Hidehiko Iwasa, Haruo Takemura, and Naokazu Yokoya, "A Registration Method Using Stereo Cameras with an Inertial Sensor for Augmented Reality", Technical Report of IEICE, PRMU 99-192 (Technical Report of IEICE, vol. 99, no. 574, pp. 1-8). In this case, the apparatus need only be set so that a total of at least two or more indices are always observed on the subjective-view image captured by the subjective-view camera, and the additional subjective-view image captured by the additional subjective-view camera. In this case as well, the position and orientation of the subjective-view camera can be calculated more stably than the case in which image information alone is used.

(Modification 3)

Figure 5:
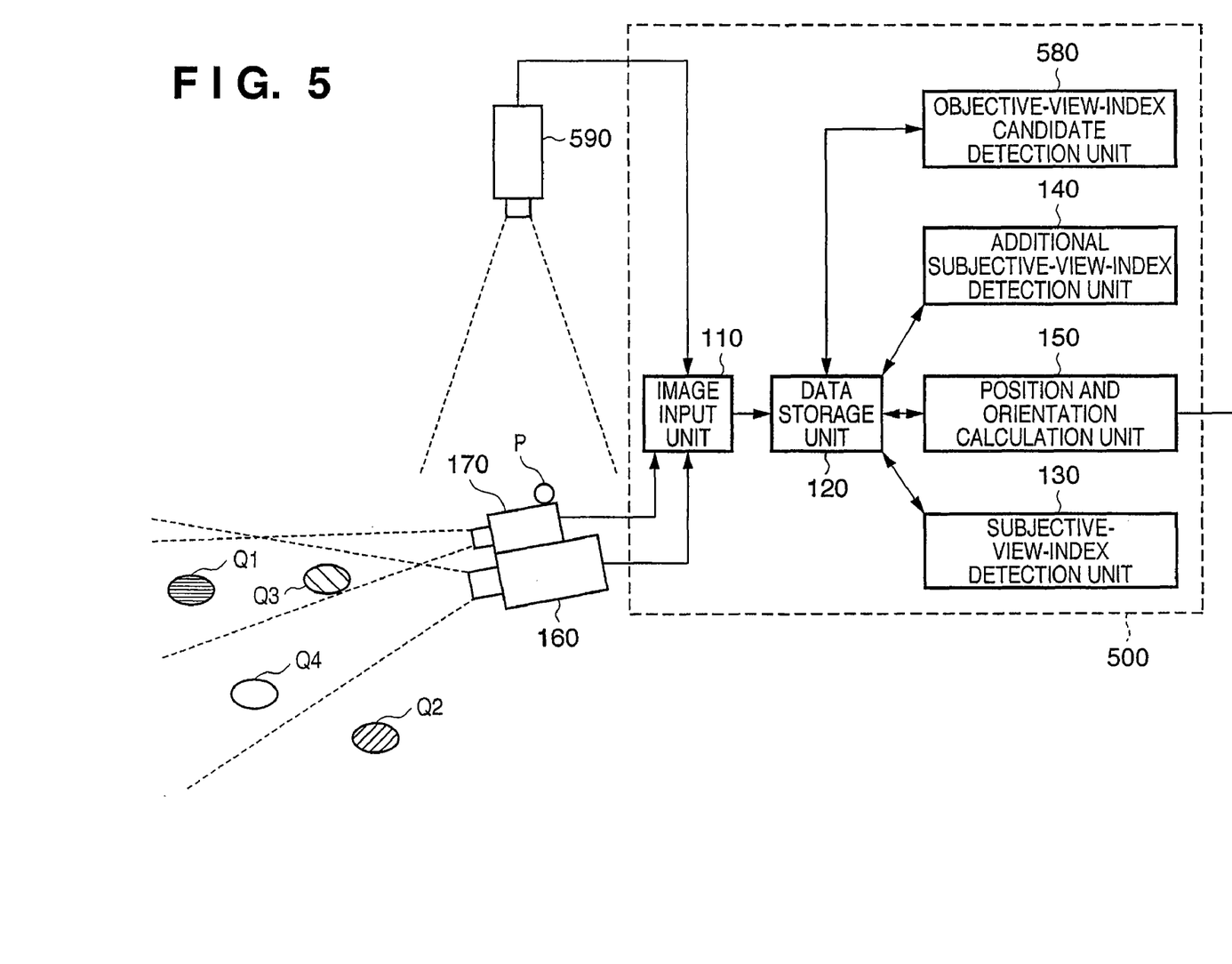
FIG. 5 is a block diagram showing the arrangement when an objective-view camera is additionally connected to the position and orientation measurement apparatus shown in FIG. 1.

In each of the above embodiments, an objective-view camera that captures an image of the subjective-view camera may be used together. FIG. 5 is a block diagram sowing the arrangement when an objective-view camera is added to the position and orientation measurement apparatus shown in FIG. 1.

An objective-view camera 590 has a known position and orientation. The objective-view camera captures an image of an objective-view-index P. The objective-view-index has a fixed position and orientation relative to the subjective-view camera 160. An objective-view-index detection unit 580 detects the image coordinate of the objective-view-index P from the image captured by the objective-view camera 590. By applying the image coordinate of the objective-view-index P to the scheme described in US 2004/176925 A1, the position and orientation of the subjective-view camera 160 can be calculated. Note that the objective-view-index detection unit 580 can also be implemented by software when the CPU 1001 executes a program.

In this modification, the position and orientation of the subjective-view camera 160 can be stably calculated using the objective-view image.

(Modification 4)

In the description of each of the above embodiments, one additional subjective-view camera 170 is arranged. The number of additional subjective-view cameras 170 is not limited to one, but a plurality of cameras may be arranged. In this case, the position and orientation of the subjective-view camera 160 can be calculated by the same processing as in the first embodiment.

Let A be the number of additional subjective-view cameras 170, and $M_1, M_2, \ldots, M_A$ be the numbers of indices detected on respective additional subjective-view images. In this case, the error vector U is expressed by a $2(N+M_1+M_2+\ldots+M_A)$-dimensional vector. Also, the matrix $\Theta$ is expressed by a matrix of $2(N+M_1+M_2+\ldots+M_A)$ rows×6 columns.

Note that at least one of the additional subjective-view cameras 170 may be configured to have higher spatial resolution than the subjective-view camera 160, and at least one of the remaining additional subjective-view cameras 170 may be configured to have a larger angle of view than the subjective-view camera 160. With this configuration, the position and orientation of the subjective-view camera 160 can be stably calculated with high precision.

Also, the direction of the optical axis of at least one of the additional subjective-view cameras 170 may be configured to be different from that of the optical axis of at least one of the remaining additional subjective-view cameras 170. With an additional subjective-view camera 170 having a larger angle of view than the subjective-view camera 160, the position of the subjective-view camera 160 can be calculated with high precision. Therefore, by setting the optical axis of the subjective-view camera 160 and that of the additional subjective-view camera 170 with a larger angle of view in different directions, the positional precisions of the subjective-view camera 160 in both the optical axis direction and in-frame direction can be improved by complementing their positional precisions with each other. On the other hand, since the additional subjective-view camera 170 having higher spatial resolution than the subjective-view camera 160 can detect highly reliable indices, the orientation of the subjective-view camera 160 can be calculated with high precision, as described in the above embodiments.

(Modification 5)

In each of embodiments, a camera which captures light having a wavelength different from visible light may be used as the additional subjective-view camera 170. For example, a camera which captures infrared rays may be used as the additional subjective-view camera 170, and indices that emit or reflect infrared rays may be used as additional subjective-view-indices. In this case, by capturing an image of indices which are arranged on a ceiling and emit infrared rays by the additional subjective-view camera 170, the indices can be detected more stably than the case in which a camera which captures visible light is used.

Note that a camera that captures infrared rays may be used as the subjective-view camera 160, and indices that emit or reflect infrared rays may be used as subjective-view-indices. Furthermore, cameras that capture infrared rays may be used as both the subjective-view camera 160 and additional subjective-view camera 170, and indices that emit or reflect infrared rays may be used as both subjective-view-indices and additional subjective-view-indices.

The camera that captures light having a wavelength different from visible light is not limited to the camera that captures infrared rays, but a camera that captures ultraviolet rays or the like may be used. Furthermore, a camera that simultaneously captures light having a wavelength different from visible light, and the visible light may be used.

Note that a monochrome camera may be used as the additional subjective-view camera 170, and indices that do not include any color information may be used as additional subjective-view-indices. In this case, a processing time can be suppressed from being prolonged compared to a case using the color camera as the additional subjective-view camera 170.

(Modification 6)

In each of the above embodiments, the correction value $\Delta s$ is calculated by the method expressed by equation (14) and the estimated value s is updated by substituting s by $s+\Delta s$. However, the method of calculating s based on the matrix $\Theta$ and error vector U is not limited to such specific method. For example, s may be calculated by combining, e.g., an LM method (Levenberg-Marquardt method) as a known iterative solving method of a nonlinear equation. Alternatively, a statistical method such as M-estimation or the like as a known robust estimation method may be combined. Any other numerical calculation methods may be combined.

Other Embodiments

The aforementioned embodiments can be implemented by software by a computer (or a CPU, MPU, or the like) of a system or apparatus.

Therefore, a computer program itself supplied to in the computer to implement the aforementioned embodiments using the computer implements the present invention. That is, the computer program itself for implementing the functions of the aforementioned embodiments is one embodiment of the present invention.

Note that the form of the computer program which implements the aforementioned embodiments is not particularly limited as long as it is computer-readable. For example, the program may adopt the forms of an object code, a program to be executed by an interpreter, script data to be supplied to an OS, and the like, but the present invention is not limited to them.

The computer program which implements the aforementioned embodiments is supplied to the computer via a storage medium or wired/wireless communications. As the storage medium for supplying the program, for example, magnetic storage media such as a flexible disk, hard disk, magnetic tape, and the like, optical/magneto-optical storage media such as an MO, CD, DVD, and the like, a nonvolatile semiconductor memory, and so forth may be used.

As a program supply method using the wired/wireless communications, a method using a server on a computer network is available. In this case, a server stores a data file (program file) that can be a computer program which forms the present invention. The program file may be either an executable format file or source codes.

Then, the program file is supplied by downloading to a client computer that has accessed the server. In this case, the program file may be segmented into a plurality of segment files, which may be allocated on different servers.

That is, the server which provides the program file for implementing the aforementioned embodiments to the client computer is also one embodiment of the present invention.

Also, a storage medium, which stores the encrypted program which implements the aforementioned embodiments, may be delivered to the user, and key information required to decrypt the encrypted program may be supplied to the user who meets a predetermined condition, so as to allow to install the program on a computer of the user. The key information can be supplied to the user by making him or her download it from a home page via, e.g., the Internet.

The computer program for implementing the aforementioned embodiments may use the functions of an OS which already runs on the computer.

Furthermore, some functions of the computer program for implementing the aforementioned embodiments may be configured by firmware of an expansion board or the like attached to the computer, or may be executed by a CPU of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-249962, filed Sep. 14, 2006, which is hereby incorporated by reference herein in its entirety.

What is claimed is:

1. A position and orientation measurement method comprising:
   a first image input step of inputting a first image captured by a first image capture device which captures an image of a physical space;
   a second image input step of inputting a second image captured by a second image capture device which has a fixed position and orientation relative to the first image capture device and has a spatial resolution different from the first image capture device;
   a first detection step of detecting, from the first image, a feature amount associated with image coordinates of an index on the physical space;
   a second detection step of detecting, from the second image, a feature amount associated with image coordinates of an index on the physical space; and
   a position and orientation calculation step of calculating a position and orientation of the first image capture device based on the feature amounts associated with the image coordinates of the index detected in the first detection step and the second detection step,
   wherein the position and orientation calculation step calculates the position and orientation by multiplying the feature amount associated with the image coordinates of the index detected in the detection step associated with the image captured by the image capture device with the higher spatial resolution of the first detection step and the second detection step by a weight value larger than the feature amount associated with the image coordinates of the index detected in the detection step associated with the image captured by the image capture device with the lower spatial resolution.

2. A position and orientation measurement method according to claim 1, wherein the position and orientation calculation step comprising:
   a lower-resolution position and orientation calculation step of calculating a position and orientation of the first image capture device based on the feature amount associated with the image coordinates of the index detected in the detection step associated with the image captured by the image capture device with the lower spatial resolution of the first detection step and the second detection step; and
   a correction step of correcting at least one of the position and orientation of the first image capture device calculated in the position and orientation calculation step based on the feature amount associated with the image coordinates of the index detected in the detection step associated with the image captured by the image capture device with the higher spatial resolution of the first detection step and the second detection step.

3. A position and orientation measurement method according to claim 1, wherein the position and orientation calculation step comprising:
   a higher-resolution position and orientation calculation step of calculating a position and orientation of the first image capture device based on the feature amount associated with the image coordinates of the index detected in the detection step associated with the image captured by the image capture device with the higher spatial resolution of the first detection step and the second detection step; and
   a correction step of correcting the position of the first image capture device calculated in the position and orientation calculation step based on the feature amount associated with the image coordinates of the index detected in the detection step associated with the image captured by the image capture device with the lower spatial resolution of the first detection step and the second detection step.

4. The method according to claim 1, wherein the first image capture device and the second image capture device have the same image resolution and different angles of view.

5. The method according to claim 1, further comprising a sensor measurement value input step of inputting a measurement value from a sensor which measures the position or the orientation of the first image capture device, or time derivatives thereof,
   wherein the position and orientation calculation step calculates the position and orientation of the first image capture device based on the feature amounts associated with the image coordinates of the index detected in the first detection step and the second detection step, and the measurement value input in the sensor measurement value input step.

6. The method according to claim 1, further comprising:
a third image input step of inputting a third image captured by a third image capture device which captures an image of the first image capture device and has a fixed position and orientation; and
a third detection step of detecting a feature amount associated with image coordinates of a second index which has a fixed position and orientation relative to the first image capture device,
wherein the position and orientation calculation step calculates the position and orientation of the first image capture device based on the feature amounts associated with the image coordinates of the index detected in the first detection step and the second detection step, and the feature amount associated with the image coordinates of the second index detected in the third detection step.

7. The method according to claim 1, wherein the first image is an image to be presented to an observer, and the first image capture device has a fixed position or orientation, or a fixed angle of view relative to display unit which presenting the first image to the observer.

8. The method according to claim 1, wherein a direction of an optical axis of the first image capture device is different from a direction of an optical axis of the second image capture device.

9. The method according to claim 1, wherein the second image capture device includes a plurality of image capture devices,
the second image input step inputs the second image from each of the plurality of image capture devices, and
the second detection step detects feature amounts associated with the image coordinates of the index on the physical space from a plurality of the second images input in the second image input step.

10. The method according to claim 9, wherein the plurality of image capture devices include an image capture device having a higher spatial resolution than the first image capture device, and an image capture device having a lower spatial resolution than the first image capture device.

11. The method according to claim 9, wherein a direction of an optical axis of at least one of the plurality of image capture devices is different from a direction of an optical axis of at least one of the remaining image capture devices.

12. The method according to claim 1, wherein the first image capture device and the second image capture device capture images observed in different wavelength ranges.

13. A position and orientation measurement apparatus comprising:
first image input unit which inputs a first image captured by a first image capture device which captures an image of a physical space;
second image input unit which inputs a second image captured by a second image capture device which has a fixed position and orientation relative to the first image capture device and has a spatial resolution different from the first image capture device;
first detection unit which detects, from the first image, a feature amount associated with image coordinates of an index on the physical space;
second detection unit which detects, from the second image, a feature amount associated with image coordinates of an index on the physical space; and
position and orientation calculation unit which calculates a position and orientation of the first image capture device based on the feature amounts associated with the image coordinates of the index detected by the first detection unit and the second detection unit,
wherein the position and orientation calculation unit calculates the position and orientation by multiplying the feature amount associated with the image coordinates of the index detected by the detection unit associated with the image captured by the image capture device with the higher spatial resolution of the first detection unit and the second detection unit by a weight value larger than the feature amount associated with the image coordinates of the index detected in the detection unit associated with the image captured by the image capture device with the lower spatial resolution.

14. A non-transitory computer-readable recording medium storing a program for making a computer execute a position and orientation calculation method according to claim 1.

* * * * *